US011696034B1

(12) United States Patent
Hutz et al.

(10) Patent No.: US 11,696,034 B1
(45) Date of Patent: Jul. 4, 2023

(54) AUTOMATIC ADJUSTING OF VIDEO ANALYTICS RULES FOR CAMERA MOVEMENT

(71) Applicant: Alarm.com Incorporated, Tysons, VA (US)

(72) Inventors: David James Hutz, Herndon, VA (US); Allison Beach, Leesburg, VA (US); Weihong Yin, Great Falls, VA (US); Donald Gerard Madden, Columbia, MD (US); Adam Gordon, Tysons, VA (US); Christopher Silverman, Alexandria, VA (US); Donald Faraci, Falls Church, VA (US); Benjamin Asher Berg, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/910,790

(22) Filed: Jun. 24, 2020

Related U.S. Application Data

(60) Provisional application No. 62/865,349, filed on Jun. 24, 2019.

(51) Int. Cl.
| | |
|---|---|
| H04N 5/14 | (2006.01) |
| G08B 13/19 | (2006.01) |
| H04N 23/695 | (2023.01) |
| G08B 13/196 | (2006.01) |
| H04N 23/61 | (2023.01) |

(52) U.S. Cl.
CPC ....... *H04N 23/695* (2023.01); *G08B 13/1963* (2013.01); *G08B 13/19606* (2013.01); *G08B 13/19652* (2013.01); *H04N 5/144* (2013.01); *H04N 23/61* (2023.01)

(58) Field of Classification Search
USPC ......................................... 348/169
See application file for complete search history.

(56) References Cited

U.S. PATENT DOCUMENTS

| | | | |
|---|---|---|---|
| 8,405,720 B2 | 3/2013 | Gupta et al. | |
| 9,417,689 B1* | 8/2016 | Ramaswamy | ........ G06F 3/0386 |
| 2012/0086780 A1* | 4/2012 | Sharma | .............. G06K 9/00771 |
| | | | 348/46 |
| 2012/0154604 A1* | 6/2012 | Chen | .................... H04N 17/002 |
| | | | 348/187 |

FOREIGN PATENT DOCUMENTS

WO WO2015/056826 4/2015

* cited by examiner

*Primary Examiner* — Mikhail Itskovich
(74) *Attorney, Agent, or Firm* — Fish & Richardson P.C.

(57) ABSTRACT

Methods, systems, and apparatus, including computer programs encoded on a computer storage medium, for adjusting of video analytics rules for camera movement. The methods, systems, and apparatus include actions of obtaining a rule that specifies a first set of coordinates applied to a first set of images from a camera, determining an amount and direction of movement of the camera after the rule was obtained, determining, based on the amount and direction of movement of the camera, a second set of coordinates applied to a second set of images captured after the camera moved.

20 Claims, 2 Drawing Sheets

AUTOMATIC ADJUSTING OF VIDEO ANALYTICS RULES FOR CAMERA MOVEMENT

CROSS-REFERENCE TO RELATED APPLICATIONS

This application claims the benefit of U.S. Provisional Application No. 62/865,349, filed Jun. 24, 2019, which is incorporated by reference in its entirety.

TECHNICAL FIELD

This disclosure application relates generally to video analysis.

BACKGROUND

Video analysis may be used for home monitoring. For example, a home monitoring system may detect motion and, in response, provide a notification to a user that motion was detected in the home.

SUMMARY

Techniques are described for adjusting of video analytics rules for camera movement. For example, the techniques may enable a system to determine that a camera, which is monitoring for objects crossing a line between two pixels at coordinates that correspond to a left side and right side of an end of a driveway, has rotated by five degrees clockwise. In response, the system may start monitoring for objects that cross a line between two pixels that correspond to the coordinates rotated clockwise by five degrees around a center of video from the camera.

Video analytics rules may be rules used to analyze video. For example, a user might draw a virtual line on the image of their front yard to indicate that the user would like the system to provide an alert when a vehicle enters the driveway. In another example, a user might draw in an image of an area of interest in the shape of an oval around their couch to detect a pet trying to nap there. This rule geometry may be compared to the corresponding pixels of incoming video to determine if an action should be triggered or not based on the rule.

While the user is drawing these lines and boxes with the 3-D scene in mind, the rules themselves may be defined in the 2-D coordinate system of the camera image, and may be tied to the camera's field of view. If a camera should move after the user has defined the rule geometry, the camera's field of view may shift, and the rule geometry, e.g., its projection into the world, may shift with it, causing the rule not to function as originally intended. For example, if the camera looking at the front yard tilts downward, the rule shifts with the camera view and the rule may now be on the grass instead of the driveway so that cars entering the driveway will fail to trigger the intended response.

Accordingly, a system may detect and characterize camera movement, then modify the rule geometry in order to cover the same intended area or provide a determination that the intended area can no longer be properly surveilled given the new camera position.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Figure 1:
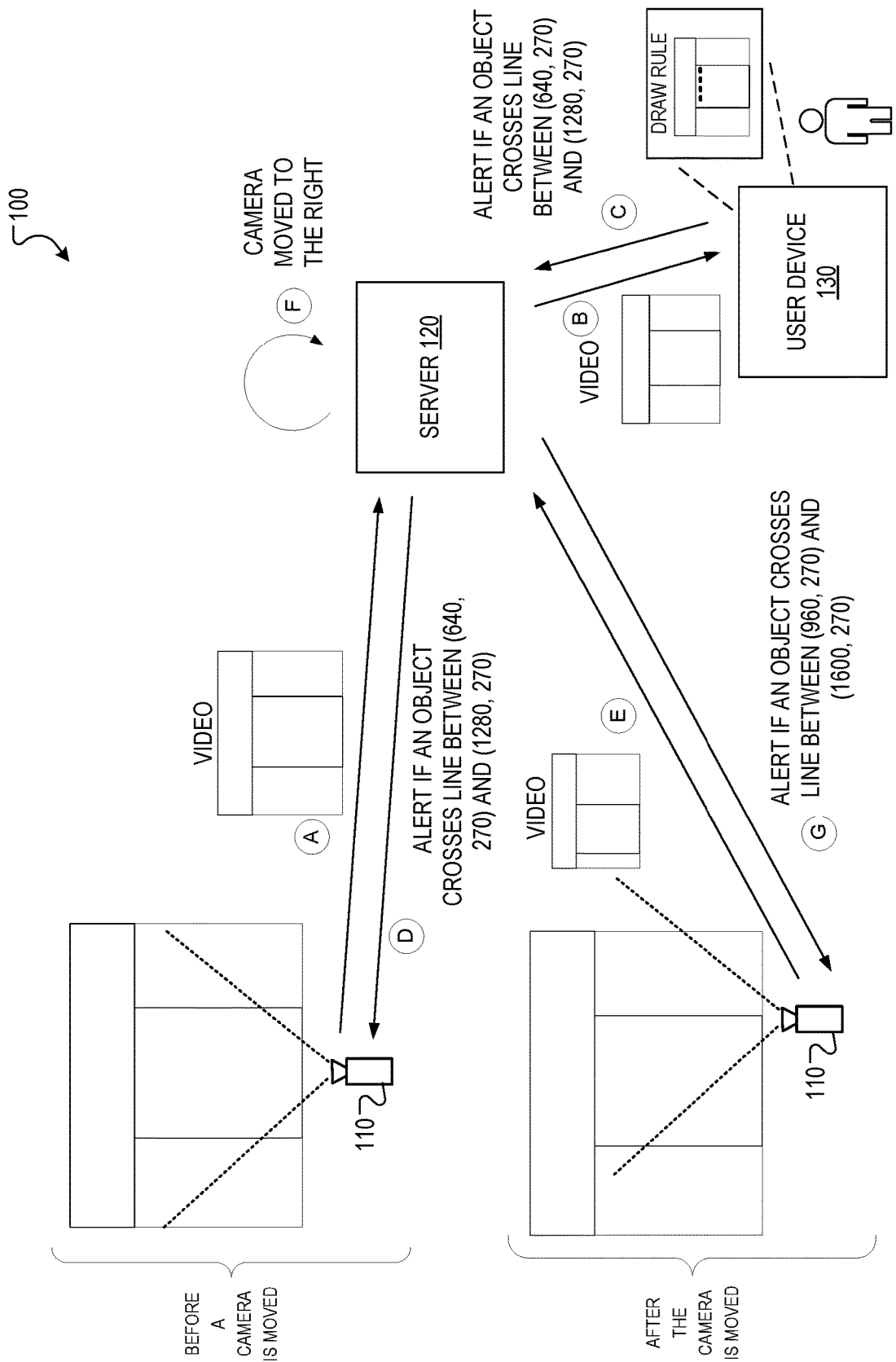
FIG. 1 illustrates an example system for adjusting of video analytics rules for camera movement.

FIG. 1 illustrates an example system 100 for adjusting of video analytics rules for camera movement. The system 100 includes a camera 110, a server 120, and a user device 130. FIG. 1 shows at the top, the camera's 110 view of a scene before the camera 110 is moved, and at the bottom, the camera's 110 view of the scene after the camera is moved.

The camera 110 may capture video of a scene and transmit the video to the server 120. For example, the camera 110 may capture video of a driveway and transmit the video to the server 120 so that a video analytics rule may be specified by a user based on the video. In another example, the camera 110 may capture video of a driveway after the camera 110 is moved so that the server 120 may determine that the camera has moved.

Additionally or alternatively, the camera 110 may include various sensors that may detect motion and may transmit data from the sensors to the server 120. For example, the camera 110 may include a gyroscope, an accelerometer, an encoder, or some other motion sensitive hardware, and may provide the server 120 indications of motion based on what the gyroscope, the accelerometer, the encoder, or the other motion sensitive hardware senses. Such indications of motion may include acceleration data, orientation data, and other data.

The camera 110 may also receive a video analytics rule from the server 120 and perform actions in response to determining that a condition for the video analytics rule has been satisfied. For example, the camera 110 may receive a video analytics rule from the server 120 that specifies that the camera 110 should transmit an alert if the camera 110 detects an object crossing a line between pixels at coordinates of (640, 270) and (1280, 270) in video captured by the camera 110, where the pixels at coordinates of (640, 270) and (1280, 270) correspond to where a left side and right side of an end of a driveway of a home are shown in the video captured by the camera 110.

In another example, after the camera 110 is moved to the right side of a driveway from a center of the driveway, possibly accidentally, the camera 110 may receive a second video analytics rule from the server 120 that specifies that the camera 110 should transmit an alert if the camera 110 detects an object crossing a line between pixels at coordinates of (960, 270) and (1600, 270) in video captured by the camera 110. In the example, the coordinates (640, 270) and (1280, 270) before the camera 110 is moved may show the same portion of a scene that is shown in the coordinates of (960, 270) and (1600, 270) after the camera 110 is moved so that the camera objects are still being detected when objects cross an end of the driveway.

The server 120 may receive the video from the camera 110 and provide the video to the user device 130 for the user to specify a video analytics rule. For example, the server 120 may receive the video of the driveway from the camera 110 before the camera 110 is moved and provide the video, unchanged, to the user device 130 so that the user may draw an area on the video for video analysis. Additionally or alternatively, the server 120 may provide an image from the video to the user device 130 instead of a video itself.

The server 120 may receive a video analytics rule from the user device 130 and then provide the rule to the camera 110. For example, the server 120 may receive, from the user device 130, a rule that specifies that an alert should be provided if an object crosses a line between the coordinates (640, 270) and (1280, 270) and then provide that rule to the camera 110.

After the camera 110 moves, the server 120 may estimate camera movement, adjust the video analytics rule, and then provide the adjusted video analytics rule to the camera. For example, the server 120 may receive a video from the camera 110 after the camera moved, determine that view shown in the video from the camera 110 has changed, in response determine that the camera moved three feet to the right, and in response determine to update the video analytics rule to alert if an object crosses a line between (960, 270) and (1600, 270), and then transmit the updated video analytics rule to the camera 110.

In some implementations, the server 120 may transmit the updated analytics rule to the camera 110 by instructing the camera 110 to delete the original rule and use the updated analytics rule. Alternatively, the server 120 may transmit the updated analytics rule to the camera 110 by instructing the camera 110 to edit the original rule to use the coordinates for the updated analytics rule.

The server 120 may estimate camera movement based on leveraging change detection already executed as part of a foreground segmentation algorithm to trigger a check. In some implementations, the server 120 may estimate camera movement based on data generated from an accelerometer, gyroscope, encoders, or other motion sensitive hardware in the camera 110 that can be used to directly estimate camera motion, or provide additional data to motion estimation techniques.

In some implementations, the server 120 may estimate camera movement by building a model of an initial scene and the rules to be applied. On each incoming frame (or when significant motion or change has been detected through other means), the server 120 may compare the incoming frame of video against that model. Depending on the available resources and the amount and type of motion, the model might vary in complexity. The server 120 may use a cascade of models, increasing in complexity, in order to properly model the camera movement.

The model may contain a number of key image feature points at various coordinates in the image. Some portion of these might be occasionally occluded by other objects during normal conditions, but should enough of these features no longer appear at their normal locations, this would indicate camera motion, and the server 120 would attempt to estimate a transformation between the original camera position and the new camera position that explains the new position of these feature locations.

For some motions of the camera 110, the model and the adjustments to the rule might be constrained to 2-D transformations within the image plane. For small translations or pan/tilt motions with little parallax effect, a simple translation in the image might sufficiently model the change, while for a rotation around the optical axis, a rotation of the image might suffice. In some cases, the patch-wise motion estimation can be used to directly arrive at this transformation. For example, the server 120 may determine that the camera 110 has only rotated and, in response, the server 120 may adjust the video analytics rule by rotating the coordinates for the rule around the center of the image by a same amount of degrees that the camera 110 was rotated.

For other camera transformations, or for environments where parallax has a noticeable effect, the model may take into account all three spatial dimensions. For example, the server 120 may determine that the camera 110 has significantly moved forward or backwards and, in response, determine that adjusting the rule requires considering all three spatial dimensions. In some implementations, the server 120 may determine the dimensions in which the camera 110 may move and, in response, model movement based on those dimensions. For example, the server 120 may determine that the camera 110 is sitting on a shelf so can only be rotated left and right and, in response, determine to only feature match along an X-axis. In another example, the server 120 may determine that the camera 110 can only be tilted up and down and, in response, determine to only feature match along a Y-axis. In yet another example, the server 120 may determine that the camera 110 can be moved forward or backward and, in response, determine to also evaluate in a Z-dimension.

One approach that the server 120 may use is Simultaneous Location and Mapping (SLAM) techniques on two or more images (one from the "home" position of the camera 110 and one from the new position). This may involve matching common visual features between the images and estimating the 3-D position of both the features and the camera 110 at the same time. This may be a computationally intensive method and accuracy may be greatly increased with more images. More images might be obtained if multiple frames are recorded during the camera motion without too much motion blur. Assumptions about relative motion across concurrent frames of video can also be used to constrain the algorithm and improve accuracy and compute complexity. Additionally, frames from previous locations that the camera 110 has been in the same room, either at install time or during operation, or frames from other cameras that overlap at least a portion of the view from the camera 110 could be used to provide more data about the structure of the room, thus the 3-D positions of the features in the room could be precomputed, and only the new position of the camera 110 would need to be solved for.

Another approach that the server 120 may use, additionally or alternatively, is to identify the floor/ground or other planar surface that is visible in both the original camera view and the new camera view. If enough features can be matched on that surface between the two images, the server 120 may compute a planar homography and thus compute the camera motion between the two images (taking into account the intrinsic camera parameters, which are known prior to installation).

The server 120 may identify such a plane in a number of ways, for example, by attempting to compute the planar homography against many pairs of features and discarding outliers, and instructing the user to draw lines and areas of interest across the ground plane. If the users do this properly, the server 120 can infer the surface, identified by scene segmentation, template matching, or other means (for example, finding rectangular edges in an interior space might identify doors, windows, walls, etc. that would serve as good planar landmarks, or by observation, as people are detected walking along the floor, the position where their feet touch the floor is observed and used to expand the visible ground plane. Since the rules may be defined relative to the ground plane, this is the plane the server 120 would most like to use to compute the homography. Once the correct homography is computed for the floor by any of these methods, the server 120 may estimate the extent of the floor by testing to see if features matched between the two positions fit the homography transformation or not.

The server 120 may additionally or alternatively use specific landmarks in the room, such as doors, wall hangings, or even a dedicated component of the system (such as the alarm panel, which could be set to display a certain pattern), to estimate camera motion. Landmarks could be found by template matching or a trained deep neural network. This approach may be particularly useful if the rule involves the landmark—for example, if a line is drawn across the threshold of a door, locating that door, the threshold may be the most important goal after camera motion. Should the server 120 determine that a landmark is out of frame, occluded from view (either due to camera motion or movement of other items in the scene, or simply missing from the scene), the server 120 could alert a user immediately.

The server 120 may perform motion estimation using known camera intrinsic and/or extrinsic parameters and constraints (the camera 110 is sitting on a shelf and thus likely only translates along the horizontal plane or pans left/right, or the camera is on a pan/tilt mount) to increase the accuracy and reduce computational complexity.

Estimates of camera motion may be evaluated by the server 120 by rendering the new view from the old view's perspective (or vice versa) and comparing the imagery directly. Depending on the technique used to compute the camera motion, this may entail the server 120 performing a simple translation of the imagery, rendering of the model computed via SLAM from the desired perspective, or image projection according to the planar homography and comparison of only that plane.

The server 120 may adjust the video analytics rule based on the estimated camera movement. The server 120 may apply a 2-D transformation directly to the rules in the image plane. For example, if the camera 110 rotated about the optical axis by five degrees, the server 120 may rotate the rules about the center of the images to match.

The server 120 may apply a 3-D transformation to a ground plane rule by using planar projection and camera intrinsics to project the original 2-D rule into the 3-D model (either using the fully 3-D SLAM-based model's ground plane or the simpler model that simply defines the planar homography of the imagery to the ground plane) from the perspective of the original camera pose, and then projected from 3-D back to 2-D using the new camera pose. If the server 120 previously used the ground plane homography to arrive at the camera motion estimation, then the server 120 can directly transform the points from one plane to another using the homography matrices.

The server 120 may also adjust rules based on their intended purpose. For example, in the case of the ground-plane line drawn across the threshold of a door described above, the server 120 may locate the door and the threshold in the new imagery and re-apply the rule based on the geometry of the threshold, effectively ignoring the camera motion. Similarly, if an area of interest originally covered a carpet, the server 120 might identify the carpet (based on the pattern or general shape) in the new imagery and redefine the rule based on that new location.

The server 120 may identify regions of the new field of view where the expected image features are missing, and can mark these regions as possible occlusions of the original scene. For example, the camera might shift such that it is now partially behind a potted plant. The server 120 may identify these occluded regions as a byproduct of calculating correspondences between the home location and the new location.

Any movement of the camera or significant changes to the scene, particularly those that occlude the camera's field of view, may be of interest to a central station or the user. Accordingly, in response to determining that the camera 110 has moved, the server 120 may generate and provide a notification that includes a before and after view, and/or a description of the estimated motion or change ("camera tilted down 30 degrees", "camera slid backward 33 cm", or "30% of camera view occluded"). The server 120 may buffer the video recorded during, before, and/or after the movement to provide the user some clues as to what caused the movement. The server 120 may automatically process the video to detect and/or recognize humans, faces, animals, etc. that might be responsible.

The server 120 may determine whether rules are shifted out of the new FOV of the camera, or into an area determined to be occluded, and, in response to determining that has occurred, the server 120 may notify the user or central station that the rules are no longer going to work as intended. The server 120 may differentiate between a rule that is partially affected (one portion of the line is out of the frame, but 80% is still in frame and thus operable), and one that is completely out of view. Similarly, the server 120 may decide that while the line is still in frame, the area that serves as the approach to the line is out of frame or occluded in such a way that detection will be degraded. These conditions could each trigger the server 120 to provide notifications to users according to preferences.

At some point, the amount of motion exceeds the ability to estimate. For example, the features visible after a very fast motion no longer have any matches in the original camera view, e.g., a camera falling from a shelf or a cloth being thrown over the camera. In this event, the server 120 may fail to match a sufficient number of features, and report failure, notifying the user that no rules could be applied and the camera 110 is in effect offline as the video analytics rule can no longer be used.

As shown in FIG. 1, in stage (A) the camera 110 transmits video captured of a driveway to the server 120. In stage (B), the server 120 transmits the video to the user device 130. In stage (C), the user device 130 transmits a video analytics rule that specifies that an alert should be provided if an object crosses a line between the pixels at coordinates of (640, 270) and (1280, 270). In stage (D), the server 120 transmits the rule to the camera 110. In stage (E), the camera 110 transmits a video after the camera 110 is moved to the server 120. In stage (F), the server 120 estimates camera movement and adjusts the rule based on the camera movement. In stage (G), the server 120 transmits the adjusted rule to the camera 110.

Figure 2:
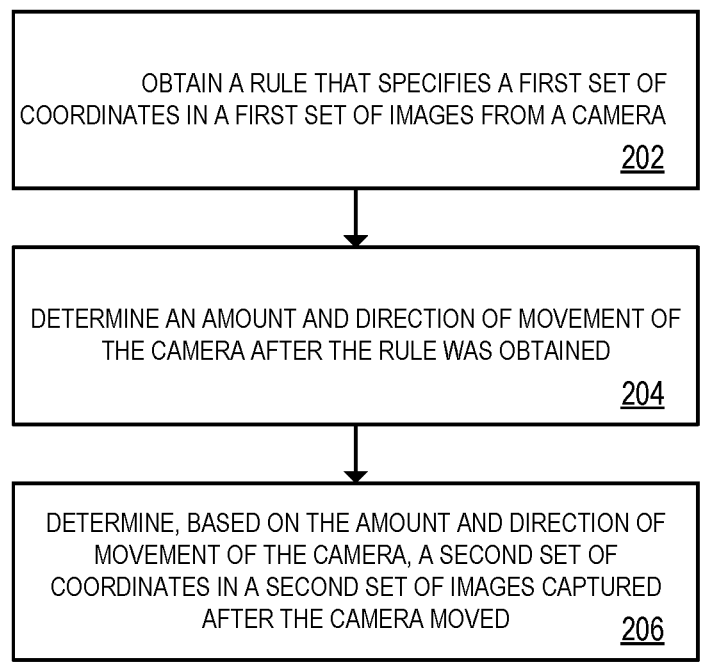
FIG. 2 is a flow diagram of an example process for adjusting of video analytics rules for camera movement.

FIG. 2 is a flow diagram of an example process 200 for adjusting of video analytics rules for camera movement. The process 200 may be performed by the system 100 shown in FIG. 1, or some other system.

The process 200 includes obtaining a rule that specifies a first set of coordinates in a first set of images from a camera (202). For example, the server 120 may obtain a rule from the user device 130 that specifies that the user wants to receive an alert if a person is detected walking within five feet of a safe. Coordinates in images may refer to coordinates applied to images. For example, a rule may specify coordinates and not include any images, but be later applied to images to detect objects that cross a line between the coordinates in the images. In another example, a user may see an image and then specify coordinates in the image to be applied to later images to detect events, and a rule may then be generated to specify those coordinates without specifying or including the image.

In some implementations, obtaining a rule that specifies a first set of coordinates in a first set of images from a camera includes receiving the rule from a user device. For example, the server 120 may receive the video of the driveway from the camera 110 before the camera 110 is moved and provide the video, unchanged, to the user device 130 so that the user may draw an area on the video for video analysis, and then the server 120 may receive, from the user device 130, a rule that specifies that an alert should be provided if an object crosses a line between the coordinates (640, 270) and (1280, 270) as shown in the video provided to the user device 130.

In some implementations, the rule specifies that an alert should be provided upon detection of an object crossing a line between coordinates of the first set of coordinates. For example, after the server 120 receives the rule that specifies that an alert should be provided if an object crosses a line between the coordinates (640, 270) and (1280, 270) as shown in a current view of the camera 110, the server 120 may provide the rule to the camera 110.

The process 200 includes determining an amount and direction of movement of the camera after the rule was obtained (204). For example, the server 120 may determine from video and accelerometer data from the camera 110 that the camera 110 has moved one foot backwards and rotated five degrees clockwise.

In some implementations, determining an amount and direction of movement of the camera after the rule was obtained includes determining a set of matches between feature points in the first set of images and feature points in the second set of images and determining the amount and direction of movement of the camera based on differences in locations of the feature points. For example, the server 120 may determine that a group of pixels that represents a border between a driveway and sidewalk has moved twenty pixels to the left and ten pixels down as the pixels before and after movement have similar red, green, blue values, and the serer 120 may then determine the amount and direction of movement of the camera 110 from the determined changes in position of the group of pixels.

In some implementations, determining an amount and direction of movement of the camera after the rule was obtained includes receiving accelerometer data generated from motion sensed by an accelerometer in the camera and determining the amount and direction of movement of the camera based on the accelerometer data. For example, the server 120 may determine that accelerometer data from the camera indicates that the camera has been moved one foot to the left. In some implementations, determining an amount and direction of movement of the camera after the rule was obtained includes obtaining gyroscope data generated from changes in yaw, pitch, roll detected by a gyroscope in the camera and determining the amount and direction of movement of the camera based on the accelerometer data. Additionally or alternatively, the determining an amount and direction of movement of the camera after the rule was obtained includes using an integrated inertial measurement unit (IMU) to estimate both translation and rotation.

The process 200 includes determining, based on the amount and direction of movement of the camera, a second set of coordinates in a second set of images captured after the camera moved (206). For example, the server 120 may determine a 3-D model of the scene from video before the camera 110 moved, determine where the first set of coordinates fall in the 3-D model, determine a second 3-D model of the scene from video after the camera 110 moved, determine where the first set of coordinates falls in the 3-D model given the amount and direction of movement of the camera, and determine the second set of coordinates from where first set of coordinates falls in the 3-D model given the amount and direction of movement of the camera.

In some implementations, determining, based on the amount and direction of movement of the camera, a second set of coordinates in a second set of images captured after the camera moved includes determining the second set of coordinates based on both the first set of coordinates and the amount and direction of the movement of the camera. For example, the server 120 may map the first set of coordinates in the image map to x,y,z locations in the real world relative to the camera, then determine the second set of coordinates as where the x,y,z locations would appear in an image captured by the camera 110 after the camera 110 is moved in the amount and direction of movement.

In some implementations, determining the second set of coordinates based on both the first set of coordinates and the amount and direction of the movement of the camera includes performing 2-D or 3-D transformation of the first set of coordinate based on the amount and direction of the movement of the camera. For example, the server 120 may perform a 2-D transformation on the first set of coordinates based on the amount and direction of the movement of the camera 110.

For example, a first set of coordinates in the first image may map to world coordinates based on the camera projection corresponding to the original pose. Once the change in pose of the camera is estimated, a new camera projection may be formulated to translate the same world coordinates to new image coordinates. The technique for translation and accuracy may depend on how much information is known about the world (e.g., is a 3-D model available, an estimate of the ground plane, or no data at all), what kind of movement is estimated (e.g., a simple rotation may use only a 2-D transformation of the pixels in image space), and how the movement was estimated (direct measurement of camera movement with an IMU or other means or via video analysis).

In some implementations, the process 200 includes providing the second set of coordinates to the camera, wherein the camera is configured to detect for events based on the second set of coordinates. For example, the server 120 may transmit an instruction to the camera 110 to delete a prior rule that specifies the first set of coordinates and then transmit a new rule that specifies the second set of coordinates to the camera 110. Alternatively, the server 120 may transmit an instruction to the camera 110 to update an existing rule to use the second set of coordinates instead of the first set of coordinates.

In some implementations, in response to receiving the second set of coordinates, the camera is configured to detect an object crossing a line between coordinates of the second set of coordinates. For example, in response to receiving the coordinates (960, 270) and (1600, 270), the camera 110 may then provide an alert if an object crosses a line between the coordinates (960, 270) and (1600, 270) as shown in a view of the camera 110 after the camera is moved.

In some implementations, providing the second set of coordinates to the camera includes providing an instruction to the camera to update a rule to use the second set of coordinates instead of the first set of coordinates. For example, the server 120 may transmit an instruction to the camera 110 to update the existing rule that specifies that the camera 110 should transmit an alert if the camera 110 detects an object crossing a line between pixels at coordinates of (640, 270) and (1280, 270) in video captured by the camera 110 to instead transmit an alert if the camera 110 detects an object crossing a line between pixels at coordinates of (960, 270) and (1600, 270) in video captured by the camera after the camera 110 is moved so that the camera objects are still being detected when objects cross an end of the driveway.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   maintaining, at a server, a first rule that specifies coordinate points of a first end of a first line and coordinate points of a second end of the first line in a first set of images from a camera,
      wherein the first line is monitored for object crossings in accordance with the first rule;
   providing, by the server to the camera, the first rule to be maintained at the camera;
   determining, by the server, an amount and direction of movement of the camera after the first rule was provided to the camera;
   in response to determining the amount and the direction of movement of the camera after the first rule was provided to the camera, determining, by the server and using the amount and direction of movement of the camera and the first end and the second end of the line, a first transformation for the coordinate points of the first end of the first line and a second transformation for the coordinate points of the second end of the first line, wherein the first transformation for the coordinate points of the first end of the first line match the amount and direction of movement of the camera;
   determining, by the server, coordinate points of a first end of a second line and coordinate points of a second end of the second line in a second set of images captured after the camera moved, the determining comprising:
      determining the coordinate points of the first end of the second line by transforming coordinate points of the first end of the first line by the first transformation, and
      determining the coordinate points of the second end of the second line by transforming coordinate points of the second end of the first line by the second transformation;
   transmitting, by the server to the camera, (i) the coordinate points of the first end of the second line and the coordinate points of the second end of the second line and (ii) a second rule to monitor the second line for object crossings; and
   triggering, by the server, at least one processor of the camera to monitor the second line maintained at the camera for object crossings in accordance with the second rule maintained at the camera instead of the first rule.

2. The method of claim 1, wherein determining, by the server, coordinate points of a first end of a second line and coordinate points of a second end of the second line in a second set of images captured after the camera moved comprises:
   performing 2-D or 3-D transformation of the coordinate points of the first end of the first line and the coordinate points of the second end of the first line using the amount and direction of the movement of the camera.

3. The method of claim 1, wherein determining, by the server, an amount and direction of movement of the camera after the first rule was provided to the camera comprises:
   determining a set of matches between feature points in the first set of images and feature points in the second set of images; and
   determining the amount and direction of movement of the camera using differences in locations of the feature points.

4. The method of claim 1, wherein determining, by the server, an amount and direction of movement of the camera after the first rule was provided to the camera comprises:
   receiving accelerometer data generated from motion sensed by an accelerometer in the camera; and
   determining the amount and direction of movement of the camera using the accelerometer data.

5. The method of claim 1, wherein maintaining, at a server, the first rule that specifies coordinate points of a first end of a first line and coordinate points of a second end of the first line in a first set of images from a camera comprises:
   receiving the first rule from a user device.

6. The method of claim 1, wherein maintaining, at a server, the first rule that specifies coordinate points of a first end of a first line and coordinate points of a second end of the first line in a first set of images from a camera comprises:
- receiving the first set of images from the camera;
- providing the first set of images to a user; and
- receiving the coordinate points of the first end of the first line and the coordinate points of the second end of the first line from the user without receiving any images from the user, wherein the coordinates points of the first end of the first line and the coordinate points of the second end of the second line were specified by the user relative to a scene shown in the first set of images.

7. The method of claim 1, wherein, triggering at least one processor of the camera to monitor the second line maintained at the camera for object crossings in accordance with the second rule maintained at the camera instead of the first rule comprises:
- configuring the camera to detect, in response to receiving the coordinate points of the first end of the second line and the coordinate points of the second end of the second line, an object crossing the second line between the coordinate points of the first end of the second line and the coordinate points of the second end of the second line.

8. The method of claim 1, wherein triggering at least one processor of the camera to monitor the second line maintained at the camera for object crossings in accordance with the second rule maintained at the camera instead of the first rule comprises:
- providing an instruction to the camera to update the first rule to the second rule to use the coordinate points of the first end of the second line and the coordinate points of the second end of the second line instead of the coordinate points of the first end of the first line and the coordinate points of the second end of the first line.

9. The method of claim 1, wherein maintaining the first rule comprises maintaining, for the first rule, the coordinate points of the first end of the first line and the coordinate points of the second end of the first line and skipping maintenance of any images for the first rule.

10. A system comprising:
- one or more computers and one or more storage devices storing instructions that are operable, when executed by the one or more computers, to cause the one or more computers to perform operations comprising:
- maintaining, at a server, a first rule that specifies coordinate points of a first end of a first line and coordinate points of a second end of the first line in a first set of images from a camera,
  - wherein the first line is monitored for object crossings in accordance with the first rule;
- providing, by the server to the camera, the first rule to be maintained at the camera;
- determining, by the server, an amount and direction of movement of the camera after the first rule was provided to the camera;
- in response to determining the amount and the direction of movement of the camera after the first rule was provided to the camera, determining, by the server and using the amount and direction of movement of the camera and the first end and the second end of the line, a first transformation for the coordinate points of the first end of the first line and a second transformation for the coordinate points of the second end of the first line, wherein the first transformation for the coordinate points of the first end of the first line match the amount and direction of movement of the camera;
- determining, by the server, coordinate points of a first end of a second line and coordinate points of a second end of the second line in a second set of images captured after the camera moved, the determining comprising:
  - determining the coordinate points of the first end of the second line by transforming coordinate points of the first end of the first line by the first transformation, and
  - determining the coordinate points of the second end of the second line by transforming coordinate points of the second end of the first line by the second transformation;
- transmitting, by the server to the camera, (i) the coordinate points of the first end of the second line and the coordinate points of the second end of the second line and (ii) a second rule to monitor the second line for object crossings; and
- triggering, by the server, at least one processor of the camera to monitor the second line maintained at the camera for object crossings in accordance with the second rule maintained at the camera instead of the first rule.

11. The system of claim 10, wherein determining, by the server, coordinate points of a first end of a second line and coordinate points of a second end of the second line in a second set of images captured after the camera moved comprises:
- performing 2-D or 3-D transformation of the coordinate points of the first end of the first line and the coordinate points of the second end of the first line using the amount and direction of the movement of the camera.

12. The system of claim 10, wherein determining, by the server, an amount and direction of movement of the camera after the first rule was provided to the camera comprises:
- determining a set of matches between feature points in the first set of images and feature points in the second set of images; and
- determining the amount and direction of movement of the camera using differences in locations of the feature points.

13. The system of claim 10, wherein determining, by the server, an amount and direction of movement of the camera after the first rule was provided to the camera comprises:
- receiving accelerometer data generated from motion sensed by an accelerometer in the camera; and
- determining the amount and direction of movement of the camera using the accelerometer data.

14. The system of claim 10, wherein maintaining, at a server, the first rule that specifies coordinate points of a first end of a first line and coordinate points of a second end of the first line in a first set of images from a camera comprises:
- receiving the first rule from a user device.

15. The system of claim 10, wherein maintaining, at a server, the first rule that specifies coordinate points of a first end of a first line and coordinate points of a second end of the first line in a first set of images from a camera comprises:
- receiving the first set of images from the camera;
- providing the first set of images to a user; and
- receiving the coordinate points of the first end of the first line and the coordinate points of the second end of the first line from the user without receiving any images from the user, wherein the coordinates points of the first end of the first line and the coordinate points of the second end of the second line were specified by the user relative to a scene shown in the first set of images.

16. A non-transitory computer-readable medium storing software comprising instructions executable by one or more computers which, upon such execution, cause the one or more computers to perform operations comprising:
  maintaining, at a server, a first rule that specifies coordinate points of a first end of a first line and coordinate points of a second end of the first line in a first set of images from a camera,
    wherein the first line is monitored for object crossings in accordance with the first rule;
  providing, by the server to the camera, the first rule to be maintained at the camera;
  determining, by the server, an amount and direction of movement of the camera after the first rule was provided to the camera;
  in response to determining the amount and the direction of movement of the camera after the first rule was provided to the camera, determining, by the server and using the amount and direction of movement of the camera and the first end and the second end of the line, a first transformation for the coordinate points of the first end of the first line and a second transformation for the coordinate points of the second end of the first line, wherein the first transformation for the coordinate points of the first end of the first line match the amount and direction of movement of the camera;
  determining, by the server, coordinate points of a first end of a second line and coordinate points of a second end of the second line in a second set of images captured after the camera moved, the determining comprising:
    determining the coordinate points of the first end of the second line by transforming coordinate points of the first end of the first line by the first transformation, and
    determining the coordinate points of the second end of the second line by transforming coordinate points of the second end of the first line by the second transformation;
  transmitting, by the server to the camera, (i) the coordinate points of the first end of the second line and coordinate points of the second end of the second line and (ii) a second rule to monitor the second line for object crossings; and
  triggering, by the server, at least one processor of the camera to monitor the second line maintained at the camera for object crossings in accordance with the second rule maintained at the camera instead of the first rule.

17. The method of claim 2, wherein performing 2-D or 3-D transformation of the coordinate points of the first end of the first line and the coordinate points of the second end of the first line using the amount and direction of the movement of the camera comprises:
  determining to perform a 2-D transformation instead of a 3-D transformation of the coordinate points of the first end of the first line and the coordinate points of the second end of the first line first set of coordinates using the amount and direction of the movement of the camera; and
  performing the 2-D transformation on the coordinate points of the first end of the first line and the coordinate points of the second end of the first line.

18. The method of claim 17, wherein determining to perform a 2-D transformation instead of a 3-D transformation of the coordinate points of the first end of the first line and the coordinate points of the second end of the first line using the amount and direction of the movement of the camera comprises:
  determining that the direction of the movement is a pan or tilt motion; and
  in response to determining that the direction of the movement is a pan or tilt motion, determining to perform a 2-D transformation instead of a 3-D transformation of the coordinate points of the first end of the first line and the coordinate points of the second end of the first line.

19. The method of claim 17, wherein determining to perform a 2-D transformation instead of a 3-D transformation of the coordinate points of the first end of the first line and the coordinate points of the second end of the first line using the amount and direction of the movement of the camera comprises:
  determining that the direction of the movement is only a rotation; and
  in response to determining that the direction of the movement is only the rotation, determining to perform a 2-D transformation instead of a 3-D transformation of the coordinate points of the first end of the first line and the coordinate points of the second end of the first line.

20. The method of claim 2, wherein performing 2-D or 3-D transformation of the coordinate points of the first end of the first line and the coordinate points of the second end of the first line using the amount and direction of the movement of the camera comprises:
  determining whether the amount of movement and the direction of the movement of the camera comprises movement other than a rotation around an optical axis of the camera;
  in response to determining the amount of movement and the direction of the movement of the camera comprises movement other than the rotation around the optical axis of the camera, performing the 3-D transformation on the coordinate points of the first end of the first line and the coordinate points of the second end of the first line;
  in response to determining the amount of movement and the direction of the movement of the camera does not comprise movement other than the rotation around the optical axis of the camera, performing 2-D transformation.

* * * * *